Patented Oct. 14, 1952

2,614,083

UNITED STATES PATENT OFFICE 2,614,083

METAL CHLORIDE SCREENING SMOKE MIXTURE

John C. Bailar, Jr. and Robert W. Parry, Urbana, Ill., assignors to the United States of America as represented by the Secretary of the Navy No Drawing. Application October 13, 1944,
Serial No. 558,610

1 Claim. (Cl. 252—305)

This invention relates to a screening smoke mixture. It is particularly concerned with a chloride-containing mixture wherein the chlorine is associated with an inorganic rather than an organic carrier.

The production of smoke screens is a problem which has received great attention, for mixtures which will produce an adequate screen of smoke are of considerable importance not only in war time, but in times of peace as well. It has been known that mixtures which incorporate chlorine as one of the ingredients would produce superior smoke screens on burning of the mixture. However, customary practice has been to provide an organic carrier for the chlorine, and this procedure has suffered the obvious drawbacks attendant on carriers of this type.

We have found that a greatly superior screening smoke mixture can be produced by using a complex compound of potassium chloride and ferric chloride known as potassium ferrichloride. This complex compound, which has the formula $KFeCl_4$, serves as a carrier for the amount of chlorine necessary for the production of the desired gases formed on burning the mixture, which also contains other ingredients as described below. This complex chlorine-containing compound can be prepared from hydrated ferric chloride and potassium chloride by the practice of a simple one-step evaporation process, preferably carried out at temperatures below 205° C., whereby equimolar quantities of $FeCl_3 \cdot 6H_2O$ and of $KCl$ are heated together in an evaporating vessel until the water is all removed. The resulting compound is then ground, preferably to a fineness whereby the material can pass through a 20 mesh screen, the ground material then being ready to incorporate in the mixture.

The mixture itself, in addition to the potassium ferrichloride, contains elemental aluminum powder, zinc oxide, and sodium nitrate. Where desired, equivalent materials may be substituted in whole or in part for any of these ingredients. The recommended composition is one containing 8 per cent Al, 30 per cent BnO, 2.2 per cent NaHO₃ and 59.8 per cent $KFeCl_4$. While best results can be obtained through utilization of a mixture which approximates this composition, some latitude may be observed in the proportions of the various ingredients which are incorporated in the mix.

Upon ignition, the reaction of the mixture appears to proceed as follows:

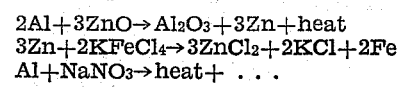

While good results can be obtained by using the mixture described above, the efficiency of the process may be somewhat further increased by adding a small percentage of hexachlorethane ($C_2Cl_6$) to remove the iron produced in the reaction.

Within the scope of the appended claim, various modifications and changes in the nature and proportions of the ingredients may be made by those skilled in the art without departing from the nature of the invention.

What is claimed is:

A smoke-producing composition consisting of about 8 per cent powdered aluminum, about 30 per cent zinc oxide, about 2.2 per cent sodium nitrate, and about 59.8 per cent the material prepared by heating to dryness at temperatures below 205° C. a mixture of equimolecular proportions of potassium chloride and hydrated ferric chloride.

JOHN C. BAILAR, Jr.
ROBERT W. PARRY.

REFERENCES CITED

The following references are of record in the file of this patent:

UNITED STATES PATENTS

| Number | Name | Date |
|---|---|---|
| 2,409,201 | Finkelstein | Oct. 15, 1946 |

FOREIGN PATENTS

| Number | Country | Date |
|---|---|---|
| 127,031 | Great Britain | May 29, 1919 |

OTHER REFERENCES

Mellor, Inorganic and Theoretical Chemistry (1928), vol. 14 (pages 104–105).